(12) United States Patent
Casino

(10) Patent No.: US 6,701,249 B1
(45) Date of Patent: Mar. 2, 2004

(54) NAVIGATION SYSTEM WITH WIRELESS LOGGING FOR BILLING

(75) Inventor: Roy Casino, Mundelein, IL (US)

(73) Assignee: Navigation Technologies Corp, Chicago, IL (US)

( * ) Notice: Subject to any disclaimer, the term of this patent is extended or adjusted under 35 U.S.C. 154(b) by 0 days.

(21) Appl. No.: 10/023,146

(22) Filed: Dec. 18, 2001

(51) Int. Cl.[7] .................................................. G06F 7/00
(52) U.S. Cl. ....................................... 701/208; 701/210
(58) Field of Search ................................ 701/200, 201, 701/202, 207, 208, 209, 210, 211, 213; 705/1, 13, 33, 34, 39, 40, 44

(56) References Cited

U.S. PATENT DOCUMENTS

| 4,951,211 A | | 8/1990 | De Villeroche | |
| 4,954,958 A | * | 9/1990 | Savage et al. | 701/202 |
| 5,948,040 A | * | 9/1999 | DeLorme et al. | 701/201 |
| 6,107,944 A | | 8/2000 | Behr | |
| 6,289,276 B1 | | 9/2001 | Ahrens et al. | 701/200 |
| 6,324,473 B1 | * | 11/2001 | Eschenbach | 701/215 |
| 6,405,123 B1 | * | 6/2002 | Rennard et al. | 701/200 |

FOREIGN PATENT DOCUMENTS

| EP | 1150267 | 10/2001 |
| EP | 1152383 | 11/2001 |
| EP | 1197924 | 4/2002 |

* cited by examiner

*Primary Examiner*—Marthe Y. Marc-Coleman
(74) *Attorney, Agent, or Firm*—Frank J. Kozak; Jon D. Shutter; Lawrence M. Kaplan (57) ABSTRACT

A navigation system includes a computing platform that has geographic data and navigation applications installed locally. Use of the computing platform is monitored and reported via a wireless communications system to a remotely located facility. The remotely located facility handles billing the end user based on use of the navigation system. The remotely located facility also transmits authorization back to the local computing platform to enable the end user to obtain requested navigation services.

20 Claims, 8 Drawing Sheets

NAVIGATION SYSTEM WITH WIRELESS LOGGING FOR BILLING

BACKGROUND OF THE INVENTION

The present invention relates to navigation systems, and more particularly, the present invention relates a navigation system with a feature that enables a user to pay for the navigation system based on usage.

Navigation systems provide various useful features, such as calculating routes to desired destinations, providing guidance for following calculated routes, displaying maps, and so on. There are various kinds of navigation systems that deliver navigation-related and map-related features. One type of navigation system is a standalone navigation system. In a standalone navigation system, all the navigation software applications and geographic data needed to provide navigation-related features to an end user are located on a computing platform located with the end user. In another type of navigation system, the navigation software applications and geographic data are located on a server that is remote from the end user. In this type of navigation system, the end user operates a local device, such as a wireless phone, PDA ("personal digital assistant") or dedicated unit, to access the remotely located navigation application software and data. In this type of navigation system, navigation-related features are provided to the end user via a user interface of the local device using the remotely located navigation application software and data. Another type of navigation system is a hybrid type navigation system. In a hybrid type navigation system, some of the navigation software applications or data are installed on the end user's local device or system and some of the navigation software applications or data are located remotely.

These various types of navigation systems provide useful features to users. There continues to be room for improvements.

SUMMARY OF THE INVENTION

To address these and other objectives, the present invention comprises a navigation system that includes a computing platform that has geographic data and navigation applications installed locally. Use of the computing platform is monitored and reported via a wireless communications system to a remotely located facility. The remotely located facility handles billing the end user based on use of the navigation system. The remotely located facility also transmits authorization back to the local computing platform to enable the end user to obtain requested navigation services.

DETAILED DESCRIPTION OF THE PRESENTLY PREFERRED EMBODIMENTS

I. EXEMPLARY NAVIGATION SYSTEM PLATFORM

A. Overview

Figure 1:
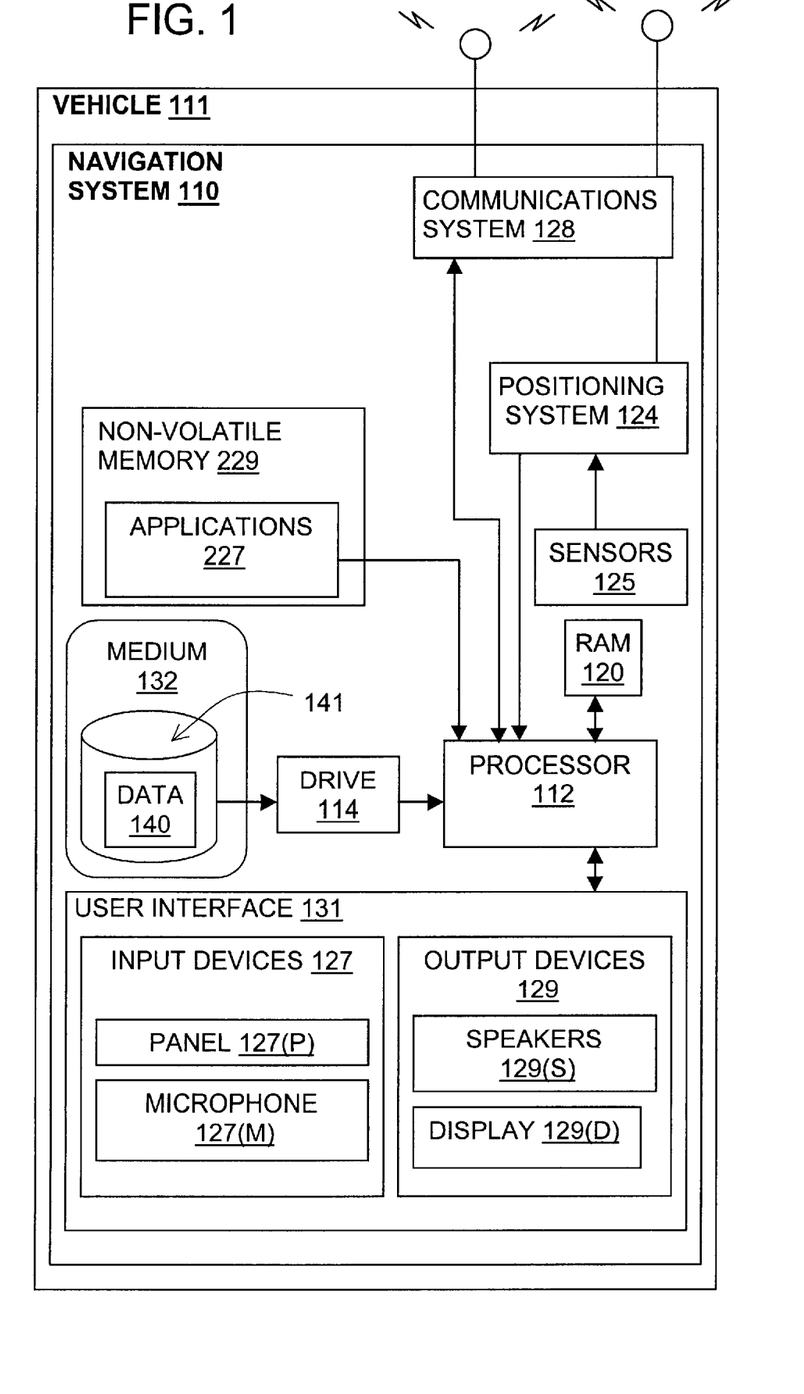
FIG. 1 is a block diagram illustrating a navigation system.

Referring to FIG. 1, there is a diagram illustrating an exemplary embodiment of a navigation system 110. In the embodiment shown in FIG. 1, the navigation system 110 is located in a vehicle 111, such as an automobile, truck, or bus. The navigation system 110 is a combination of hardware and software components. The hardware components of the navigation system 110 may include a processor 112, memory 120, and so on. In the embodiment of FIG. 1, the navigation system 110 also includes a positioning system 124 that determines the position of the vehicle 111 in which it is installed. The positioning system 124 may include sensors 125 or other components that sense the speed, orientation, direction, angular acceleration, and so on, of the vehicle 111. The positioning system 124 may also include a GPS system.

The navigation system 110 also includes a user interface 131. The user interface 131 includes appropriate means 127 for receiving input from an end user of the navigation system. The input receiving means 127 may include a keyboard, keypad, or other type of input panel 127(P), a microphone 127(M), as well as other means for accepting end-user input, such as voice recognition software, and so on, through which the end user may request navigation information and services. The user interface 131 also includes appropriate means 129 for providing information back to the end user. The information providing means 129 may include a display 129(D) and speakers 129(S) (including speech synthesis hardware and software) through which the end user can be provided with information and services from the navigation system 110.

The navigation system 110 also includes a communications system 128. The communications system 128 includes the appropriate hardware and software to send and receive data messages wirelessly. The communications system 128 may be implemented using any available technology for transmitting messages. The communications systems 128 is operatively coupled to other components of the navigation system 110 so that data can be sent from and received by the navigation system, as explained in more detail below.

All of the components described above may be conventional (or other than conventional) and the manufacture and use of these components are known to those skilled in the art.

B. The Geographic Database

In order to provide navigation features to an end user, the navigation system 110 uses geographic data 140. The geographic data 140 include information about one or more geographic regions or coverage areas. The geographic data 140 are stored in the vehicle 111 on a medium 132 which is located in the vehicle 111. Accordingly, the navigation system 110 includes a drive 114 (or other suitable peripheral device) into which the medium 132 can be installed and accessed. In one embodiment, the storage medium 132 is a CD-ROM disk. In another alternative embodiment, the storage medium 132 may be a PCMCIA card in which case the drive 114 would be substituted with a PCMCIA slot. Various other storage media may be used, including fixed or hard disks, DVD disks or other currently available storage media, as well as storage media that may be developed in the future.

The geographic data 140 include data specifying the positions of the roads in the covered geographic region(s). The geographic data 140 also include data relating to the roads, such as restrictions on directions of travel along the roads (e.g., one-way streets), street addresses along the roads, street names, speed limits along the roads, turn restrictions at intersections, and so on. The geographic data 140 may also include information about points of interest in the geographic area, such as hotels, restaurants, museums, stadiums, offices, automobile dealerships, auto repair shops, etc. The geographic data 140 may also include information about places, such as cities, towns, or other communities. The geographic data 140 may include other kinds of data about the geographic area.

The geographic data 140 are organized into one or more geographic databases 141.

In one embodiment, the geographic data are provided by Navigation Technologies Corporation of Chicago, Ill. However, it is understood that the inventive concepts disclosed herein are not restricted to any particular source of data.

C. The Navigation Programming

As shown in FIG. 1, the navigation system 110 includes applications 227. The applications 227 may be stored in a non-volatile storage medium 229 in the navigation system 110. Alternatively, the applications 227 and the geographic data 140 may be stored together on a single storage device or medium.

The applications 227 include the software programs that provide for the navigation-related functions and/or features performed by the navigation system 110. The applications 227 use the geographic data 140 in conjunction with input from the end user via the user interface 131, and possibly in conjunction with outputs from the positioning system 124, to provide various navigation-related features and/or functions.

Figure 2:
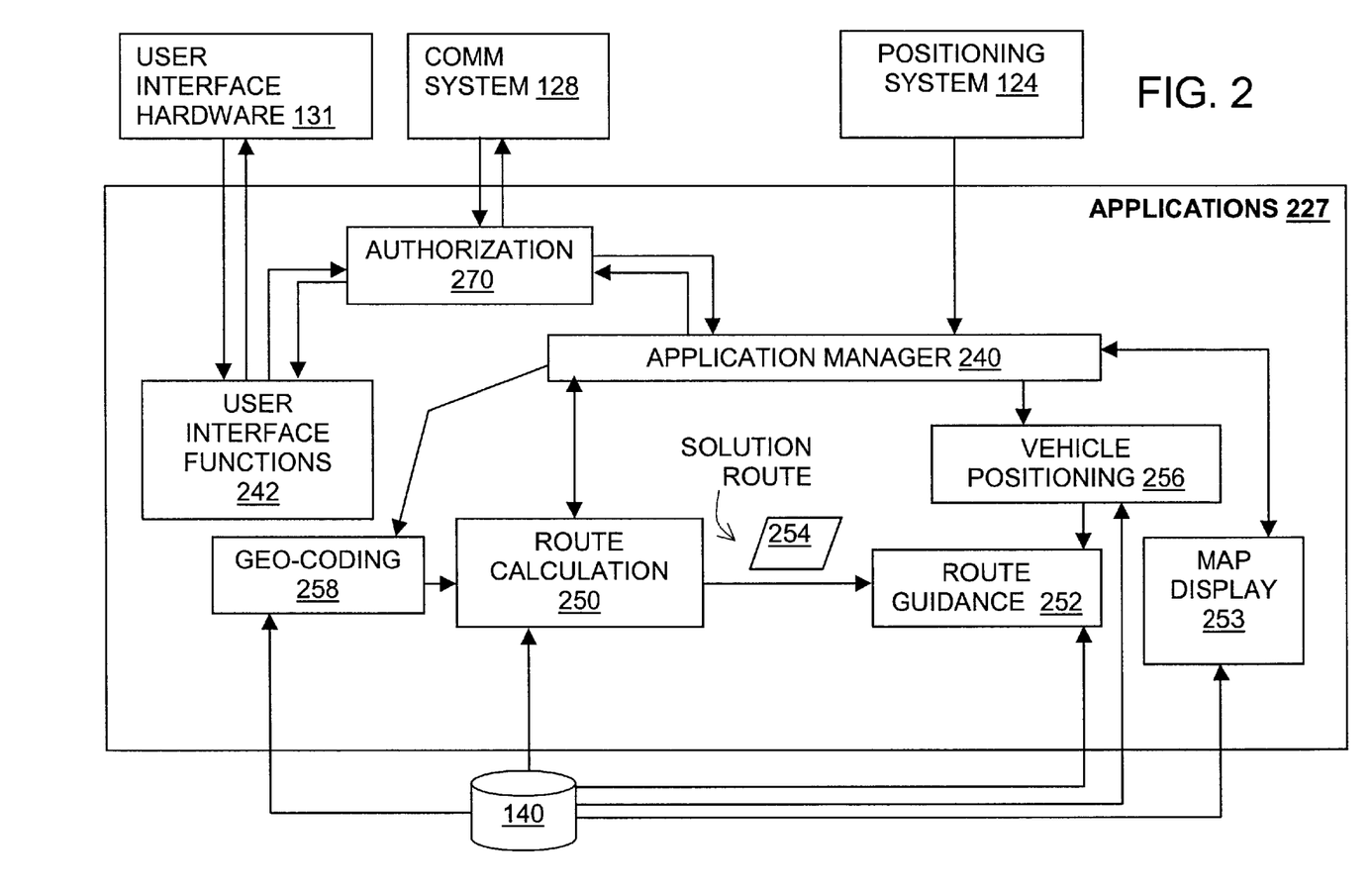
FIG. 2 is a block diagram illustrating components of the navigation system software applications shown in FIG. 1.

The applications 227 may be formed of separate component applications (also referred to as programs, subprograms, routines, or tools). The applications 227 work together through defined programming interfaces. FIG. 2 shows a block diagram illustrating some of the applications 227 in one embodiment of the navigation system 110 of FIG. 1. In addition to the applications 227 shown in FIG. 2, the navigation system 111 may include other component applications, sub-routines or programs.

In FIG. 2, the applications 227 are shown to include a navigation application manager 240. The navigation application manager 240 is a program or routine that provides for overall management of the functions of the navigation system 110. The navigation application manager 240 may also include support for and interfaces with the navigation system hardware, such as the positioning system 124. The applications 227 include user interface functions 242 to support the user interface hardware 131. These user interface functions 242 may provide for presenting menus to the end user on the screen display 129(D) of the user interface hardware 131, accepting inputs from the end user via the input devices 127 of the user interface hardware 131, displaying results to the end user on the screen display 129(D) of the user interface hardware 131, and so on.

The applications 227 include programs or routines that interface with the navigation application manager 240 and that provide for specific navigation-related features or functions to be performed by the navigation system. These navigation-related applications include a route calculation application 250, a route guidance application 252, a map display application 253, a vehicle positioning application 256 and a geo-coding application 258. The applications 227 may include other applications in addition to these.

D. Example of Operation of the Navigation System

One use of the navigation system is to provide the end user with route guidance for traveling to a destination.

A request for route guidance may originate with input from the end user. The end user identifies a desired destination. The end user may identify the desired destination by street address, location name, cross street, point of interest type, etc. The request is received via the user interface 131. The end user's input is forwarded via the user interface functions 242 and the manager application 240 to the geo-coding application 258. The geo-coding application 258 identifies one or more database records (in the geographic database 141) associated with the desired destination. The geo-coding application 258 forwards data indicating-the one or more identified database records to the route calculation application 250.

Meanwhile, the vehicle positioning application 256 identifies the road segment upon which the vehicle is currently located. The vehicle positioning application 256 forwards data indicating the identified road segment to the route calculation application 250.

Having received data that identify the starting location and the desired destination location, the route calculation application 250 attempts to determine one or more solution routes between the starting location and the destination location. A solution route is formed of a series of connected road segments over which a vehicle can travel from the starting location to the destination location. When the route calculation application 250 calculates a route, it accesses the geographic data 140 and obtains road segment data records that represent road segments around and between the starting location and the destination location. The route calculation application 250 uses the information in the road segment data records to attempt to determine at least one valid solution route from the starting location to the destination location. The route calculation application 250 may use various means or algorithms in determining solution routes. In determining a valid solution route for a vehicle to travel, the route calculation program 250 uses the data attributes associated with the road segment data records to account for direction of travel restrictions (e.g., one-way streets), turn restrictions at intersections (e.g., no left turns), and so on. The route calculation application 250 may attempt to find a solution route that takes the least time to travel, that covers the least distance, or that meets some other criteria.

The route calculation application 250 provides an output. In the embodiment of FIG. 2, the output of the route calculation application 250 is in the form of an ordered list 254 identifying a plurality of road segments. The plurality of road segments form the continuous navigable route between the origin and the destination that had been calculated by the route calculation application 250. (The route calculation application 250 may calculate more than one solution route.) The list 254 of road segments determined by the route calculation application 250 is provided to the route guidance application 252. The route guidance application 252 uses the information in the list 254, as well as additional information from the geographic database 141, to provide maneuvering instructions and advice to the end user to travel the route defined by the list 254 output by the route calculation application 250.

In order to provide maneuvering instructions at appropriate times and locations, the navigation system 110 uses data from the positioning system 124. The positioning system 124 acquires data used to determine the position of the vehicle as it is traveling. The vehicle positioning application 256 uses the data from the positioning system 124 to determine the vehicle's location relative to the geographic data 140. Based on a comparison of the vehicle's position to the positions of the road segments in the calculated driving route 254, maneuvering instructions are provided at appropriate times or locations.

The output of the route calculation application 250 may also be provided to the map display application 253 so that graphical maps may be displayed as the vehicle is traveling the calculated route.

Methods for route calculation are disclosed in U.S. Pat. No. 6,192,314; methods for providing route guidance are disclosed in. U.S. Pat. No. 6,199,013 and U.S. Pat. No. 6,212,474; methods for providing vehicle positioning are disclosed in U.S. Pat. No. 6,192,312; and methods for providing map display are disclosed in U.S. Pat. No. 6,092,076 and U.S. Pat. No. 6,163,749. The disclosures of these six patents are incorporated by reference herein. The methods disclosed in these patents represent only some of the ways that these functions can be provided and the subject matter claimed herein is not limited to any particular method. Any suitable method now known or developed in the future may be employed.

II. THE USAGE LOG FEATURE

According to embodiments disclosed herein, the navigation system 110 includes a feature that facilitates payment for navigation services based on usage.

A. First Embodiment

In a first embodiment, the navigation system includes an authorization application. Referring to FIG. 2, an embodiment of an authorization application 270 is included in the software applications 227 in the navigation system 110. The authorization application 270 operates between the user interface functions 242 and the navigation-related applications, such as the route calculation application 250 and the route guidance application 252.

Figure 3:
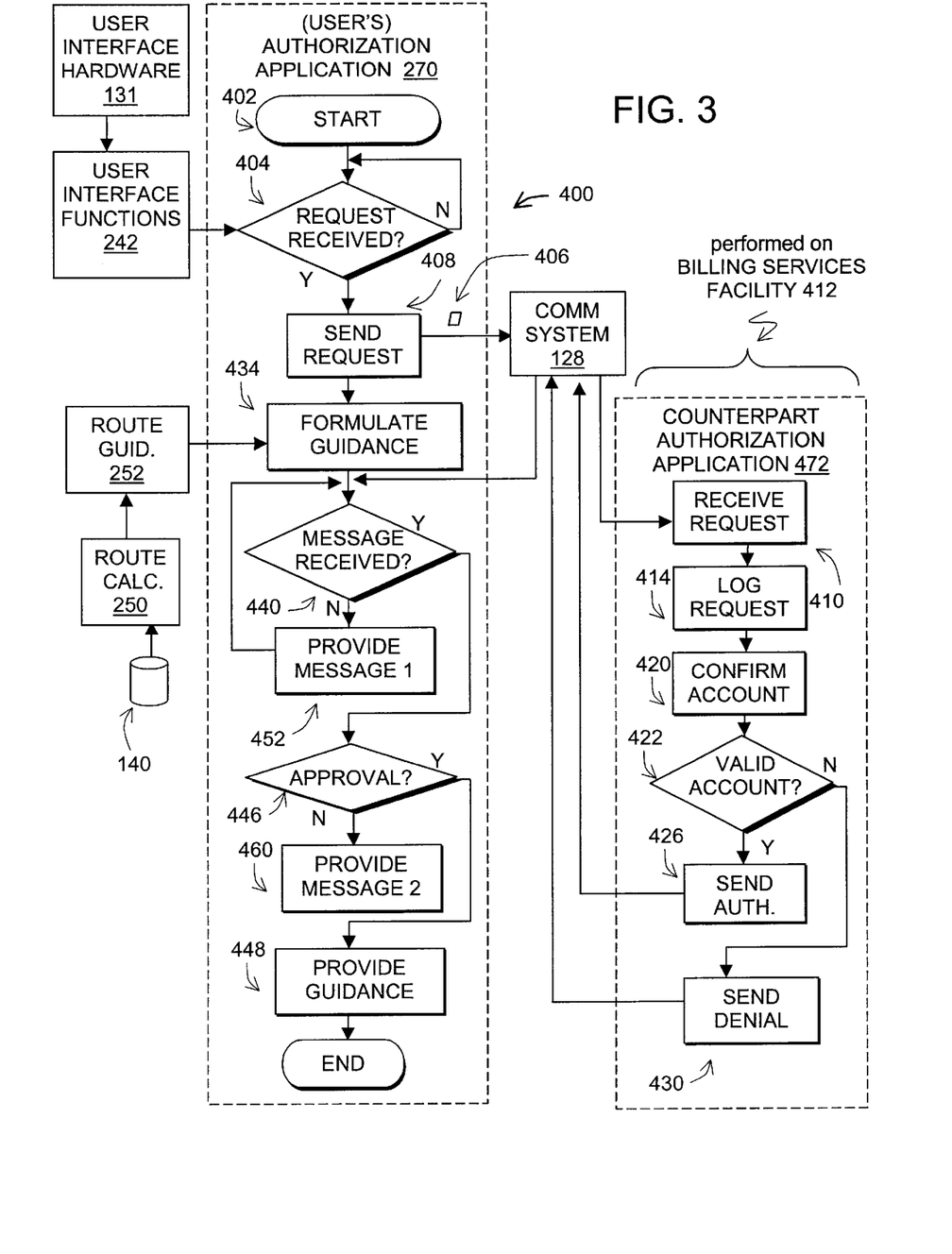
FIG. 3 is a flow chart showing steps performed in a process in the embodiment of FIG. 2.

FIG. 3 show steps in a process 400 performed by the embodiment of the authorization application 270 in FIG. 2. The process 400 begins with a request for a navigation-related service by the end user (Steps 402 and 404). The end user operates the user interface 131 and user interface functions 242 to make the request. In the process of FIG. 3, when the end user requests a navigation-related service, the authorization application 270 immediately sends a message 406 via the communications system 128 of the navigation system 110 to a billing services facility 412 (Step 408). The message 406 identifies the type of navigation-service requested, the end user's ID, etc.

The billing services facility 412 may be a commercial entity associated with either the geographic database developer or the navigation system manufacturer. Alternatively, the billing services facility may be a separate entity. As shown in FIG. 3, the billing services facility 412 operates a counterpart authorization application 472. Upon receiving the request (Step 410), the billing services facility 412 logs the request (Step 414). The billing services facility 412 also checks whether the end user has a valid account to use the navigation system and whether the account is not delinquent (Step 420). If the end user has a valid, up-to-date account, the billing services facility 412 sends an authorization message back to the end user's navigation system 110 (Steps 422 and 426). If the end user does not have a valid account or if the account is delinquent, the billing services facility 412 sends a denial message back to the end user's navigation system 110 (Steps 422 and 430).

Referring back to the step (Step 404) in which the navigation system 110 receives the request for navigation-related services from the end user, immediately upon receiving the request, the navigation-related applications (227 in FIG. 2) begin formulating a response to the request (Step 434). For example, if the request is for route guidance to a destination, the navigation-related applications 227 immediately begin calculating a route to the desired destination. When the navigation-related applications 227 in the navigation system 110 have completed formulating a response to the end user's request for a navigation-related service, the authorization application 270 checks whether an authorization message has been received back from the billing services facility 412 (Step 440). If an authorization message has been received (Steps 440 and 446), the authorization application 270 allows the end user to be provided with the requested navigation-related service via the user interface of the navigation system (Step 448). If no message has been received from the billing services facility 412, the authorization application 270 provides a message via the user interface 131 indicating that the navigation system is waiting for authorization (Step 452). If a denial message is received, the authorization application 270 provides a message on the user interface that use of the navigation system has not been authorized along with information indicating how the end user can have the use of the navigation system reestablished (Step 460).

In this embodiment, the authorization message may be formulated so that it is unique to the route. In order to provide this feature, when the navigation system receives a request for a route to a destination, it encodes data that indicates the origin and/or destination into the request for authorization that is sent to the billing services facility 412. When the billing services facility 412 formulates the authorization message, it uses the data indicating the origin and destination (and possibly the date and time) to make the authorization message specific to the request. When the authorization message is received back in the end user's navigation system, the authorization program checks that the authorization code includes the data indicating the origin and/or destination.

In this embodiment, the billing services facility maintains a log of each end user's navigation system use. The billing services facility may provide different payment plans. The end users are billed according to their use of their navigation systems according to their respective payment plans. Included among the different kinds of plans are the following:

a. Pay-per-use. According to this plan, the end user is charged a fixed amount for each request for a navigation service.

b. Pay-per-day. According to this plan, the end user is charged a fixed amount for each day that the navigation system is used. The end user is allowed unlimited use for each charged day.

c. Minimum charge. According to this plan, the end user is charged a minimum amount that includes a fixed number of navigation requests. Requests in excess of the fixed number are charged at a fixed fee per request.

d. Pay-based-on-complexity. According to this plan, the end user is charged based on the complexity of the navigation service provided. For example, a relatively short route would cost less than a cross-country route.

e. Pay-based-on-affiliated business. According to this plan, routes to destinations of certain affiliated businesses would not be charged. For example, a promotion with the XYZ Restaurant chain may provide that any use of the navigation system to provide a route to an XYZ Restaurant would be free-of-charge. Otherwise, normal charges for routes would apply, as described in the previous plans.

In addition to these plans, there are various other types and combinations of plans that can be developed and used.

Based on the payment plan, the billing services facility 412 charges each end user accordingly. The end user may be billed on a monthly basis, or based on some other period of time. For example, if the navigation system is in a rental car, the end user may be billed for the use of the navigation when the rental car is returned.

This embodiment provides the advantage that relatively close control is maintained over an end user's use of the navigation system. The messages sent between the navigation system and the billing services facility are relatively short, thereby requiring relatively modest (and thereby inexpensive) communications bandwidth.

B. Second Embodiment

An alternative embodiment is described in connection with FIGS. 4–8. The embodiment of FIGS. 4–8 is similar to the previously described embodiment and like features are indicated by like reference numbers.

Figure 4:
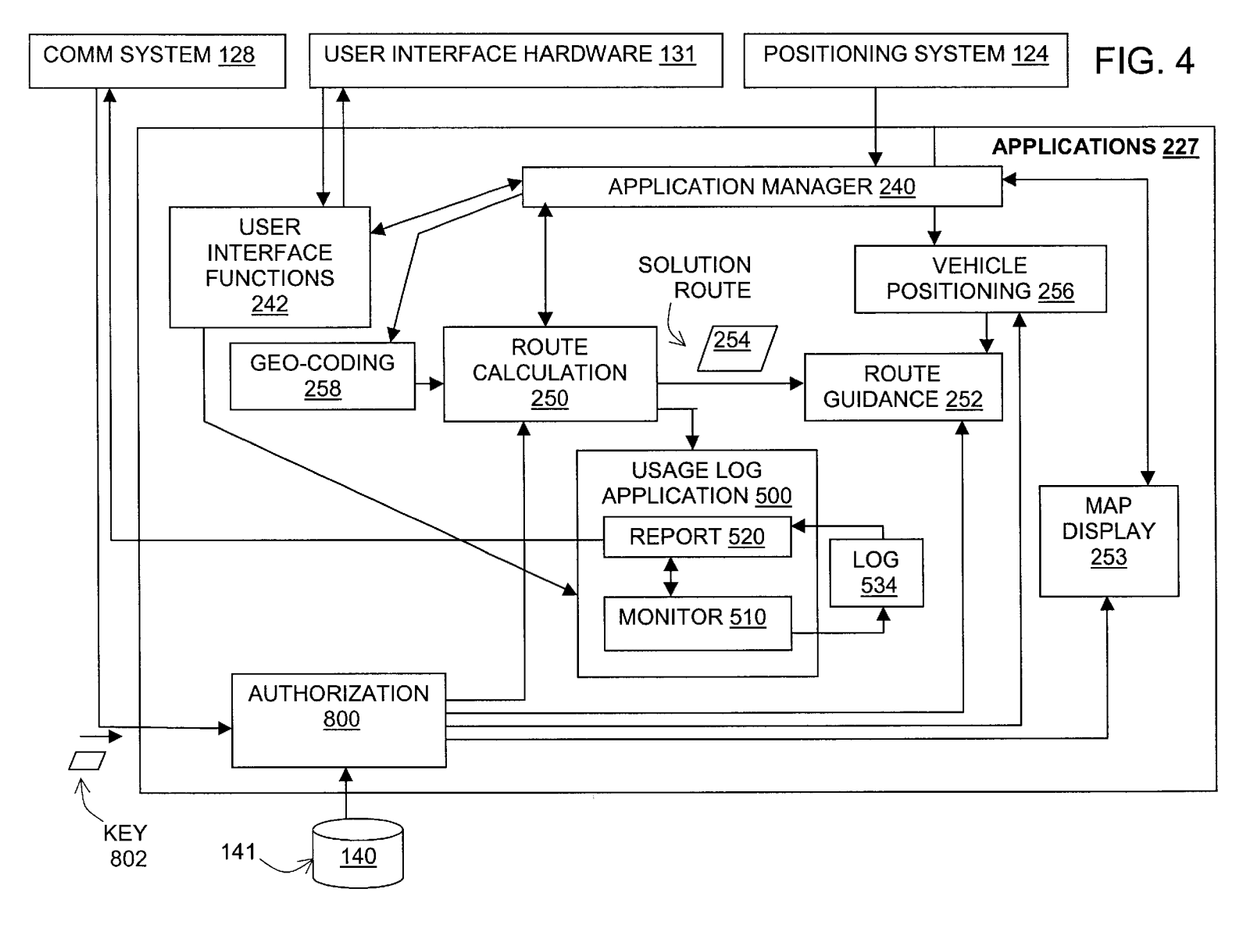
FIG. 4 is a block diagram showing components of an alternative embodiment.

In this embodiment, the navigation system 110 includes a usage log application. Referring to FIG. 4, a usage log application 500 is included among the applications 227 in the navigation system 110. In one embodiment, the usage log application 500 includes a monitoring component 510 and a reporting component 520.

The monitoring component 510 of the usage log application 500 is a software program or routine that monitors the use and operation of the navigation system 110. The monitoring component 510 operates continuously in the background while the navigation system 110 is being used. The monitoring component 510 monitors use of the navigation system 110 by the end user to provide navigation-related features. In performing this function, the monitoring component 510 receives data from some of the other navigation-related applications 227. In particular, the monitoring component 510 receives data indicating requests for navigation-related services from the end user, actions by the navigation-related applications in response to the requests from the end user, the types of navigation-related services provided to the end user in response to the requests, and the use of the navigation-related services and information by the end user.

Figure 5:
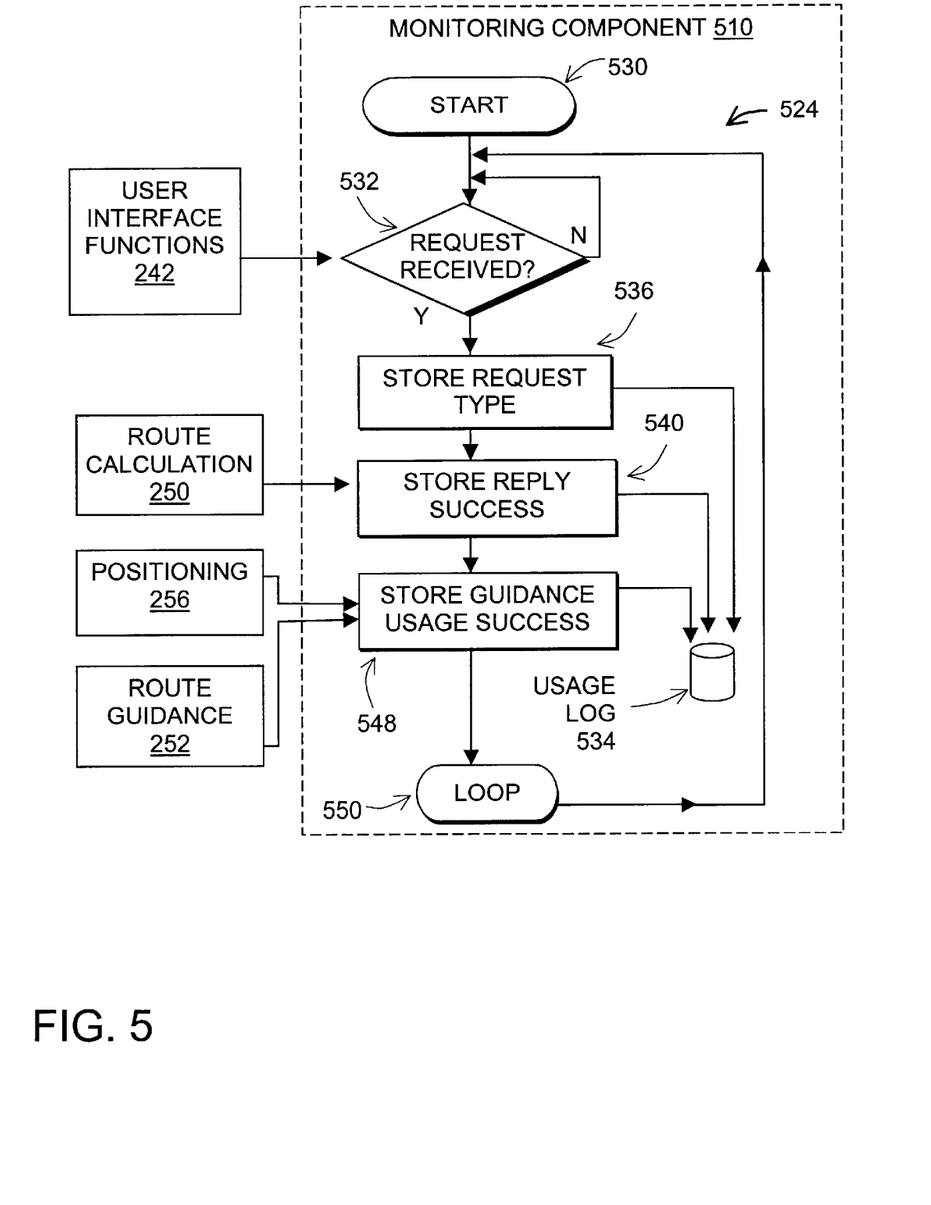
FIG. 5 is a flow chart showing steps in a process performed by the monitoring component of the usage log program of FIG. 4.

FIG. 5 shows steps in a process 524 performed by one embodiment of the monitoring component 510. After the navigation system is started, the monitoring component 310 operates continuously to monitor if the end user has used the navigation system to request a navigation-related feature (Steps 530 and 532). The monitoring component 510 may receive this information from the user interface functions 242. The monitoring component 510 then stores data that indicates the type of navigation-related feature requested by the end user in a usage log 534 (Step 536).

For example, if the end user operates the user interface (131 in FIG. 1) of the navigation system 110 to request a route to a destination, the monitoring component 510 receives data about this request. The data may indicate the destination identified by the end user. The data may also indicate how this destination was selected. For example, the end user may select the destination by entering an address. Alternatively, the end user may select the destination by requesting a route to any destination of a particular type, e.g., the closest ATM. Alternatively, the end user may select the destination by requesting a route to the nearest location of a business chain, e.g., the closest McDonald's restaurant.

After the end user requests a navigation-related feature, the navigation system 110 attempts to respond to the request. The navigation system 110 may be able to provide the end user with the requested navigation feature, or alternatively, the navigation system 110 may not be able to provide the requested navigation-related feature. This result (e.g., success or failure) is provided to the monitoring component 510 and the monitoring component 510 stores this information in the usage log 534 (Step 540 in FIG. 5).

If the end user requested guidance for a route to a destination and the navigation system 110 is able to provide a route to the destination, the end user is then provided with the guidance for following the calculated route to the destination. According to the embodiment of FIG. 4, this guidance is provided to the end user as the user travels along the route to the destination. The guidance may take the form of maneuvering instructions provided to the end user via the user interface 131 of the navigation system as the vehicle approaches each location at which a maneuver is required. Thus, guidance may be provided to the end user over a period of time. The length of time over which route guidance is provided to the end user depends on various factors, including the length of the route, the speed of traffic, whether the end user chooses to stop along the way, whether the end user departs from the route, and so on.

In the embodiment of FIG. 5, the monitoring component 510 may receive data that indicates maneuvering instructions provided to the end user. The monitoring component 510 may receive a copy of the same data sent from the route guidance application 252 to the user interface 131, or alternatively, the monitoring component 510 may receive an abridged or compressed version of the data, or a summary of the data. According to another alternative, if the map display application 253 provides data for a map image that is displayed to the end user on the display screen 129(D) of the user interface 131, the monitoring component 510 may receive data indicating the map image.

In the embodiment of FIG. 5, the monitoring component 510 receives information indicating the end user's progress along the route. This information may indicate whether the end user departed from the route, whether any stops were made along the route, the length of the route, the duration of the route, whether the user was provided with an alternative route, and so on. The monitoring component 510 also receives data indicating whether the destination was successfully reached. The monitoring component 510 stores this information (or a summary thereof) about the guidance and whether the destination was successfully reached (Step 548 in FIG. 5).

After the end user has reached the destination to which he/she has been receiving guidance from the navigation system, the monitoring component 510 resumes monitoring operation of the navigation system 110 for the next request by the end user for navigation-related features (Step 550).

Figure 6:
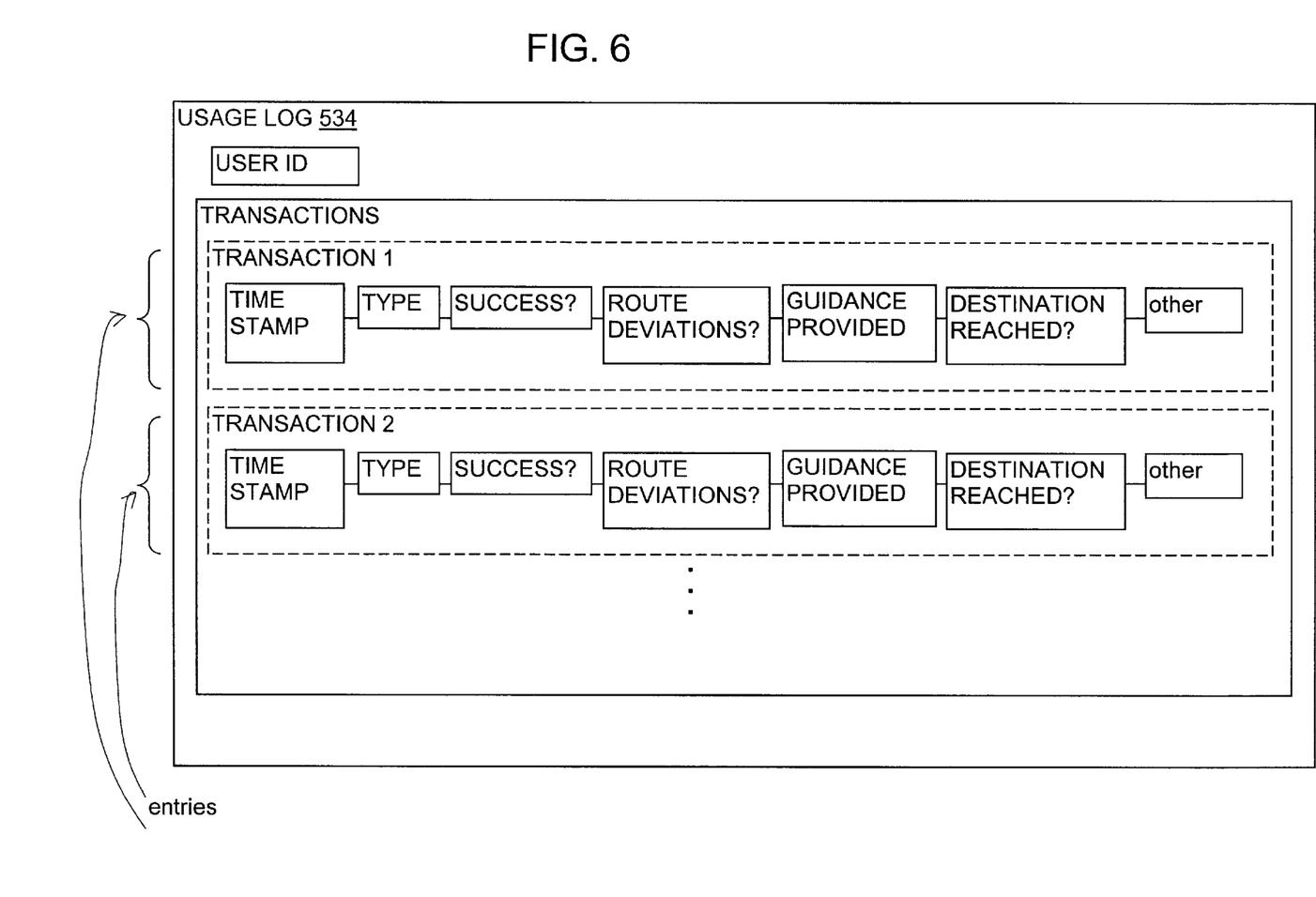
FIG. 6 is a block diagram that shows components of the usage log shown in FIG. 4.

FIG. 6 is a diagram that shows an example of some of the data stored in the usage log 534 by the monitoring component 510. The log 534 may be maintained in a non-volatile memory that is part of the navigation system 110. The monitoring component 510 makes an entry in the log 534 for each navigation-related request transaction made by the end user.

As shown in FIG. 6, when the monitoring component 510 (in FIG. 5) makes an entry in the log 534, it associates a time stamp with the entry. The time stamp indicates the time that the associated request was made to the end user. As the navigation system continues to provide new navigation information to the end user, the monitoring component 510 adds new entries to the log 534.

In some circumstances, the end user may request new navigation-related information from the navigation system while the navigation system is still providing a response to a previous request. For example, while the navigation system is providing the end user with guidance for following a route to a destination, the end user may initiate another, separate request for another navigation-related feature, such as identification of any gas stations located in proximity to the end user's position. In such a case, the monitoring component 510 may maintain multiple threads of the process 524 of FIG. 5. Thus, the monitoring component 510 keeps track of these separate threads and stores separate entries in the usage log 524 for each separate request.

Referring again to FIG. 4, the usage log application 500 also includes the reporting component 520. The reporting component 520 uses the wireless communications system 128 to send a copy of a report based on the usage log 534 to the billing services facility. The reporting component 520 sends the report automatically.

Figure 7:
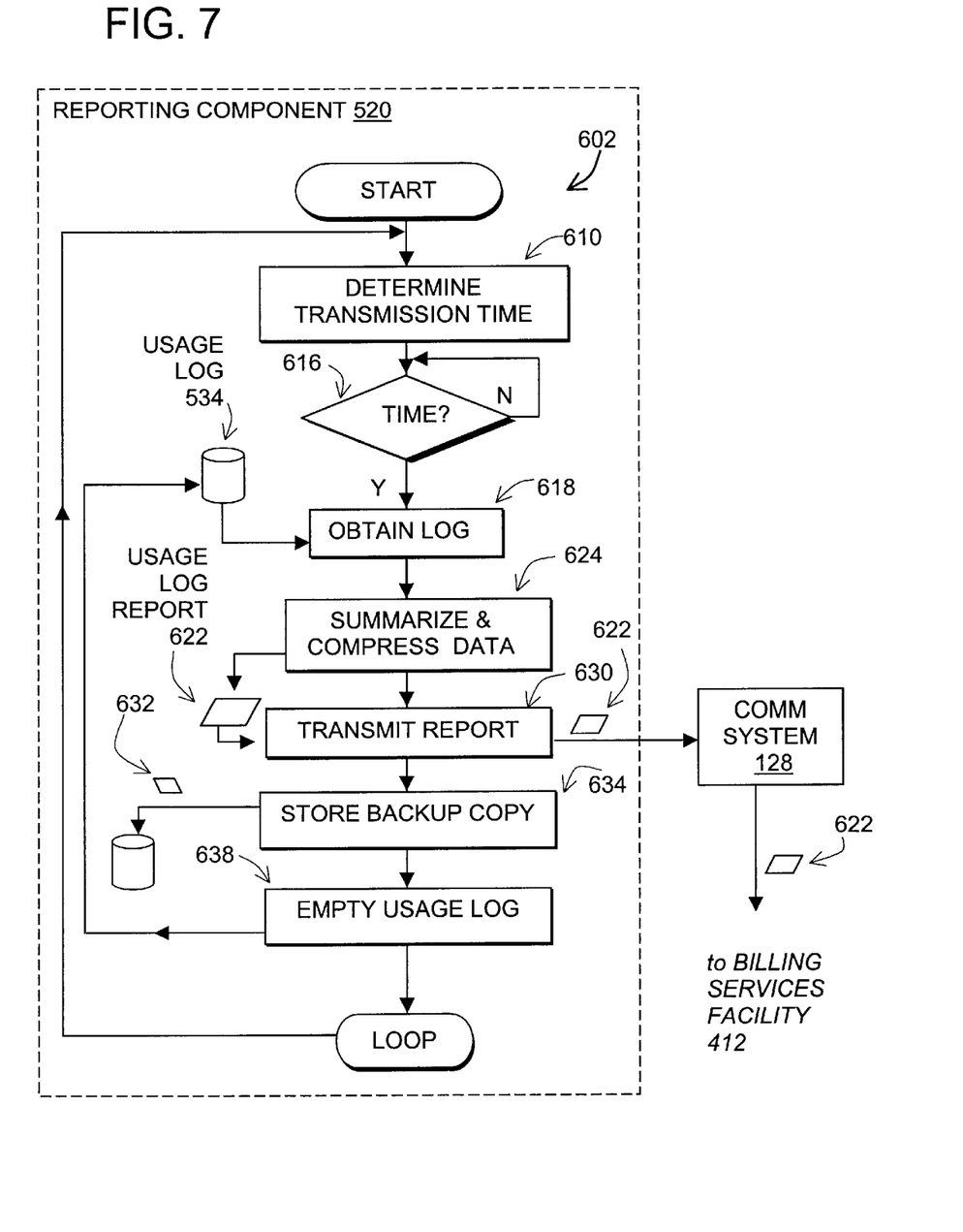
FIG. 7 is a flow chart showing steps in a process performed by the reporting component of the usage log program of FIG. 4.

FIG. 7 shows steps in a process 602 performed by the reporting component 520 to transmit a copy of a report based on the usage log 534 to the billing services facility 412. In FIG. 7, a transmission time for the report is provided. The transmission time may be a periodic fixed time, such as daily, weekly, bi-weekly, or at irregular time intervals. Alternatively, the transmission time may be instantaneously, i.e. as soon as an entry is made in the report. The transmission time may be at a time of day when communications costs are low, e.g., the middle of the night. Alternatively, the reporting component 520 may include a process to determine a transmission time (Step 610 in FIG. 7). The determination of a transmission time may be based on various factors, such as navigation system usage. According to another alternative, the transmission time may be determined by the billing services facility 412 that sends a message wirelessly to the navigation system 110 to initiate a transmission of a usage log report.

When it is time to send a copy of the usage log report, the reporting component 520 obtains a copy of the usage log 534 (Steps 616 and 618 in FIG. 7). The reporting component 520 includes steps that summarize and compress the data contained in the usage log 540 to form a usage log report 622 (Step 624 in FIG. 7). The reporting component 520 then uses the wireless communications system 128 of the navigation system 110 to send the usage log report 622 to the billing services facility 412 (Step 630).

The reporting component 520 stores a backup copy 632 of the usage log report 622 that was sent to the billing services facility 412 (Step 634). The backup copy 632 is maintained in case an error occurs in the transmission of the usage log report 622 to the billing services facility 412. The backup copy 632 is deleted after a period of time or after a confirmation is obtained that transmission of the usage log report 622 to the billing services facility was successful.

The reporting component 520 deletes all the transaction entries in the current usage log 534 in order to make room for new entries (Step 638). When the end user next operates the navigation system 110 to request a navigation-related feature, the monitoring component 510 stores a new, first transaction entry in the usage log 534, as described previously in connection with FIG. 5. The monitoring component 510 continues to add new entries to the usage log 534 as additional requests for navigation-related features are received from the end user. This process continues until the reporting component 520 transmits another usage log report to the billing services facility 412 and empties the current usage log again.

When sending the usage log report 622 to the billing services facility 412 using the communications system 128, it is understood that the usage log report 622 may be sent over various communications systems, carriers or networks. For example, the usage log report 622 may be sent via a wireless communications system from the vehicle 111 to a land-based receiver and then the usage log report may travel over land-based communications systems or the Internet to the billing services facility 412.

Figure 8:
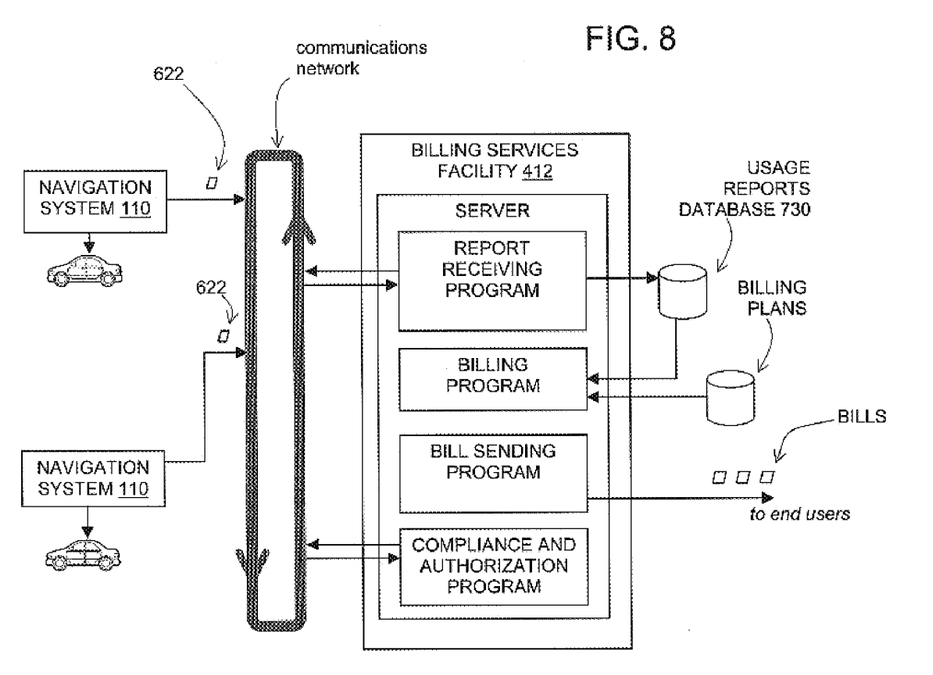
FIG. 8 is a diagram that shows components of the billing services facility used in conjunction with the embodiment of the navigation system of FIG. 4.

Referring to FIG. 8, the billing services facility 412 receives the usage log reports 622 transmitted from the navigation systems of many end users. The billing services facility 412 stores the reports 622 received from the various end users in a billing reports database 730. The billing services facility 412 operates a billing program. The billing program may include various kinds of billing plans to which end users may subscribe, as described above.

In order to ensure that end users pay for the charges they accrue using their navigation systems, the embodiment of the navigation system in FIG. 4 includes an authorization feature. This authorization feature can be implemented in several ways. One way to implement this authorization feature is to require an authorization key to use the navigation system. The authorization key is a data word or code that enables the navigation-related applications, such as the route calculation application 250 and the geo-coding application 258 in FIG. 4, to use the data 140 contained in the geographic database 141.

Referring to FIG. 4, the authorization key operates with an authorization program 800. The authorization program 800 is included among the applications 227 of the navigation system 110. The authorization application 800 may receive an authorization key 802 via the communications system 128 from the billing services facility 412. When the authorization program receives a valid authorization key 802, the authorization program 800 enables the navigation-related applications to use the data 140 contained in the geographic database 141.

The authorization key may be valid for a period of time, such as one month. If the end user is not delinquent in his/her payments for previous billing cycles, the billing services facility 412 regularly transmits a new authorization key to the end user's navigation system in order to provide for continuous, uninterrupted use of the navigation system by the end user. However, if the end user fails to pay the charges for previous use of the navigation system, the billing services facility 412 does not send a new authorization key to the end user. Then, when the prior authorization key expires, the navigation applications will be unable to access the data in the geographic database and the navigation system will cease to operate.

According to an alternative embodiment, the geographic database 141 is provided with a coded expiration date. When the navigation system attempts to access the geographic database to provide navigation-related features, the authorization program 800 checks the expiration date of the geographic database. The authorization program permits access to the geographic database until the expiration date. After the expiration date, the authorization program denies access to the geographic database. If the end user is not delinquent in payments for previously billed navigation-services, the billing services facility sends the end user a new copy of the geographic database with a new expiration date. The end user then installs the new copy of the geographic database in the navigation system and uses the navigation system, as described above. An advantage of this alternative is that the end user is provided with updated geographic data on a regular basis.

IV. ADVANTAGES

An advantage of some of the embodiments described herein is that end users are provided with flexibility regarding payment for navigation services. Instead of paying for an entire navigation system, the end user is offered a variety of billing plans to find one that suits the end user's needs.

Another advantage of some of the embodiments described herein is that the end user can be charged only for the actual use of the navigation system. Thus, an end user who expects to use the navigation system very little would not have to incur the full cost of a navigation system, but could still have the benefits of a navigation system when needed.

Another advantage of some of the embodiments described herein is that they require very little communications bandwidth. In the embodiments described above, the navigation-related information is provided to the end user from a geographic database which is stored locally with the end user's system. In some embodiments, communications are used only for billing purposes.

It is intended that the foregoing detailed description be regarded as illustrative rather than limiting and that it is understood that the following claims including all equivalents are intended to define the scope of the invention.

I claim:

1. A navigation system that uses geographic data to provide navigation-related functions to an end user, the navigation system comprising:
    a local computing platform comprising:
        a user interface located on the local computing platform and into which the end user can input requests for navigation-related functions and from which the end user is provided responses to the requests;
        a geographic database located with the local computing platform with the user interface;
        navigation programming located in the local computing platform with the geographic database, wherein the navigation programming processes the requests input by the end user into the user interface and uses the geographic database to determine said responses;
        a wireless communication system associated with the local computing platform with the geographic database and the navigation programming; and
        an authorization program that uses the wireless communications system to report usage of the local computing platform to provide navigation-related functions to a remotely located billing services facility and that prevents the end user from obtaining the navigation-related functions without authorization.

2. The navigation system of claim 1 wherein said usage includes routes calculated by the navigation programming.

3. The navigation system of claim 1 further comprising:
    a usage log program located in the local computing platform with the geographic database and the navigation programming, wherein said usage log program stores data indicating usage by the end user of the local computing platform to provide navigation-related functions and transmits via said wireless communications system said data indicating usage to the remotely located billing services facility.

4. A system for providing navigation-related services comprising:
    a. a plurality of local computing platforms, wherein each of said plurality of local computing platforms comprises:
        (1) a user interface located on the local computing platform and into which an end user can input requests for navigation-related functions and from which the end user is provided responses to the requests;
        (2) a geographic database located in the local computing platform with the user interface;
        (3) navigation programming located in the local computing platform, wherein the navigation programming processes the requests input by the end user into the user interface and uses the geographic database to determine said responses;
        (4) a wireless communication system associated with the local computing platform; and
        (5) an authorization program located on the local computing platform that sends messages indicating use of the local computing platform for providing navigation-related functions and prevents the end user from obtaining the navigation-related functions without authorization; and
    b. a remote authorization facility comprising:
        a counterpart authorization program that receives the messages from each of the local computing platforms and sends reply messages to each of the local computing platforms restricting use thereof to authorized, up-to-date users.

5. The system of claim 4 wherein said remote authorization facility further comprises an application that provides a plurality of billing plans.

6. The system of claim 5 wherein said billing plans include a plan whereby an end user is charged a fee for each calculated route.

7. The system of claim 5 wherein said billing plans include a plan whereby an end user is charged a flat monthly fee.

8. A method of providing navigation-related services, the method comprising:
    with a navigation system, receiving a request from an end user for a navigation-related service via a user interface of said navigation system, wherein said navigation system includes navigation applications and geographic data both stored locally on a computing platform operated directly by the end user;
    using a wireless communications system, obtaining authorization from a remotely located facility to provide the navigation-related service; and
    upon receiving said authorization, providing the end user with the requested navigation-related service through the navigation system, wherein said navigation-related service was determined using said navigation applications and said geographic data.

9. The method of claim 8 further comprising:
    charging the end user for each request for navigation-related services.

10. The method of claim 8 further comprising:
    charging the end user a flat fee for all navigation-related services provided within a period of time.

11. The method of claim 8 further comprising:
    prior to the step of obtaining said authorization, sending a message from the navigation system to the remotely located facility requesting said authorization.

12. The method of claim 11 wherein said message indicates at least one of an origin and a destination.

13. A method of providing navigation-related services, the method comprising:
    with a navigation system, monitoring usage by an end user for navigation-related services, wherein said navigation system includes navigation applications and geographic data both stored locally on a computing platform operated directly by the end user;
    storing data indicating said usage in a log in said navigation system;

using a wireless communications system, sending a report that indicates said usage to a remotely located facility; and operating an application in said navigation system that prevents use thereof if payment for prior usage thereof has not been made.

14. The method of claim 13 further comprising:

charging the end user for use of the navigation system.

15. The method of claim 13 further comprising:

charging the end user for each route calculated by the navigation system.

16. The method of claim 13 further comprising:

charging the end user a flat monthly fee for use of the navigation system.

17. A method of operation for a navigation system, the method comprising:

providing an end user with geographic data for the navigation system, wherein the geographic data has a coded expiration date;

installing the geographic data in the navigation system, wherein the navigation system comprises a computing platform located locally with the end user;

receiving requests from the end user for navigation-related services via a user interface of said navigation system;

with navigation programming located in said navigation system, using said geographic data to provide the navigation-related services, wherein said navigation programming prevents provision of navigation-related services after said expiration date;

using a wireless communications system associated with the navigation system to send a report to a remotely located billing services facility, wherein the report indicates usage of the navigation system;

charging the end user for usage of the navigation system; and upon maintaining an up-to-date billing account, sending data indicating an updated expiration date.

18. The method of claim 17 wherein said data indicating an updated expiration date are sent with updated geographic data.

19. The method of claim 18 further comprising:

installing said updated geographic data in said navigation system.

20. The method of claim 18 wherein updated geographic data are sent on a new storage medium.

* * * * *